Sept. 18, 1934.                J. F. FRESE                1,973,804
                          BATTERY CHARGING SYSTEM
                           Filed Feb. 18, 1933
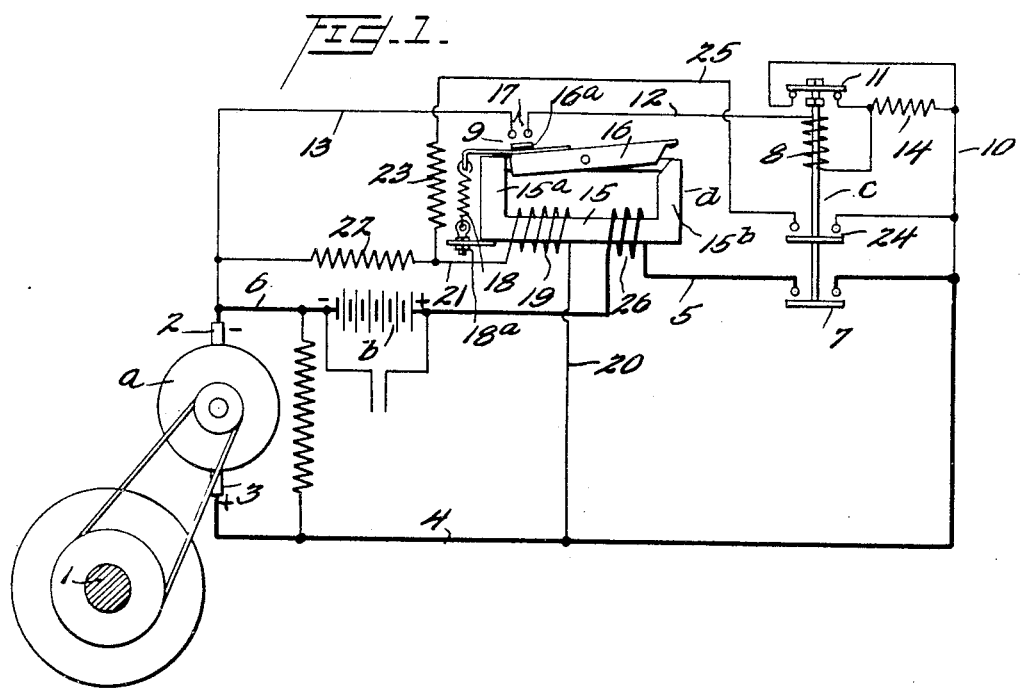
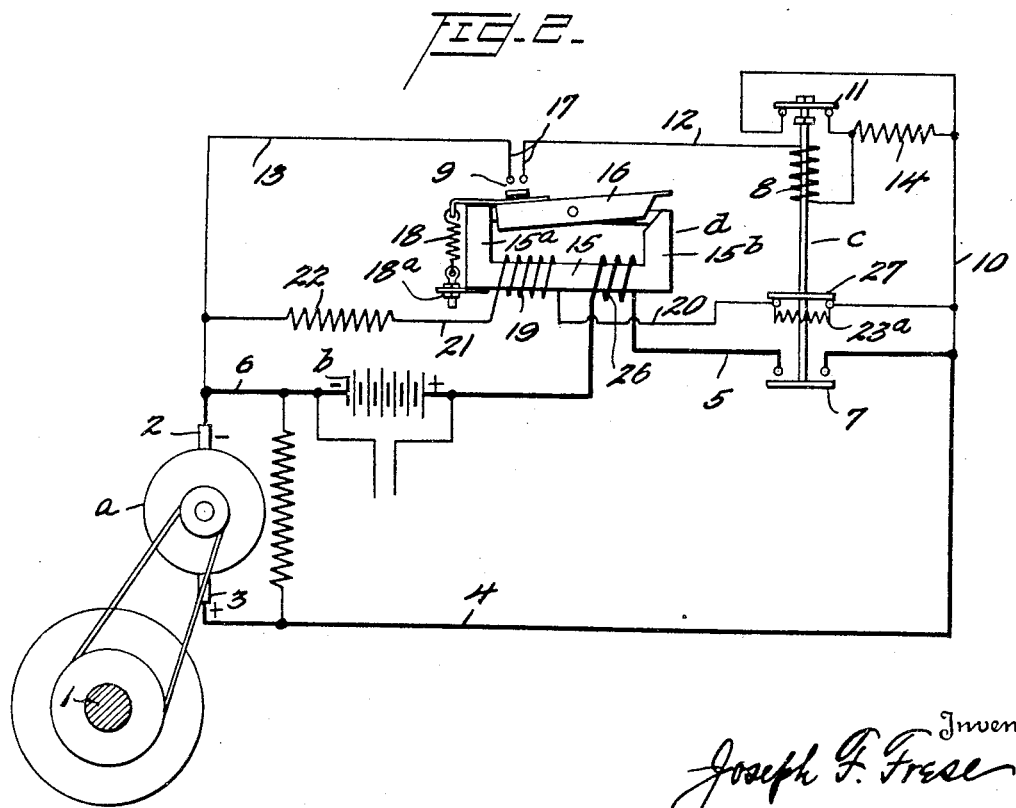
Inventor
Joseph F. Frese
By Robert Watson
Attorney Patented Sept. 18, 1934

1,973,804

UNITED STATES PATENT OFFICE 1,973,804

BATTERY CHARGING SYSTEM

Joseph F. Frese, Baltimore, Md., assignor to Monitor Controller Company, Baltimore, Md., a corporation of Maryland Application February 18, 1933, Serial No. 657,420

1 Claim. (Cl. 171—314)

This invention relates to means for charging a battery from a direct current generator operated at variable speeds, as where the generator is driven from the axle of a railway vehicle. When the vehicle is moving at a low speed the voltage of the generator is low and the voltage increases as the speed of the vehicle and generator increases. The invention resides in improved means, including a relay switch, for connecting the generator to the battery when the voltage of the former is sufficiently high for charging the battery, and for disconnecting the generator from the battery when the voltage of the generator drops below a predetermined value. The relay comprises a magnet core having two magnetizing coils, one connected permanently across the generator terminals and the other connected in the charging circuit, and a pivoted armature which operates to close and open a switch, which latter controls the actuation of a contactor for closing and opening the charging circuit. The arrangement is such that the current in the coil connected to the generator will cause the closure of the relay switch when the generator voltage reaches a predetermined value, and when the contactor switch closes the current in the charging circuit acts cumulatively with the first mentioned coil to hold the switch closed as long as the generator is charging the battery. As the coils act cumulatively to hold the switch closed, this makes it possible, while the switch is closed, to reduce considerably the current flowing in the coil which is connected to the generator terminals, and the contactor automatically introduces a resistance which has this effect. A relatively strong current is required in the coil which is connected to the generator terminals, and which may be termed the energizing coil, to cause closure of the relay, but it is desirable to weaken the current in this coil so that the switch will more readily open when the voltage of the generator drops below a suitable charging potential. When the potential of the generator falls to that of the battery, owing to a decrease in the speed of the generator, no current flows through the relay coil which is connected in the charging circuit, and therefore only the weakened current in the energizing coil connected to the generator terminals will have any magnetizing effect upon the relay, and the armature of the relay, which is movable by a spring, will be released and will open the circuit of the contactor. While the generator speed is decreasing, should the armature of the relay stick and fail to open the relay switch when no current is flowing in the charging circuit, the continued reduction in speed will result in lowering the generator voltage below that of the battery, and the current flow will then be reversed in the charging circuit, and the relay coil in the latter circuit will act to partly or wholly neutralize the magnetizing effect of the coil which is connected to the generator terminals, and the spring will then rock the switch arm to open the relay switch. This will result in disabling the contactor magnet and the contactor will open the switch in the charging circuit.

In the accompanying drawing,

Fig. 1 is a diagram illustrating the invention, and

Fig. 2 is a similar view showing a modification.

Referring to Fig. 1, $a$ indicates a direct current generator which is driven from a variable speed power source, such as a car axle 1, and $b$ indicates a battery connected to the brushes 2 and 3 of the generator armature through a charging circuit, indicated by the heavy lines 4, 5 and 6, in which is the normally open switch 7 of a contactor $c$. The coil 8 which operates to close the contactor is connected to the generator terminals through the normally open switch 9 of a relay $d$, the circuit for the coil extending from conductor 4 through conductor 10 and normally closed contactor switch 11 to the coil, thence through conductor 12 to switch 9 of relay $d$ and thence through conductor 13 to the generator. The switch 11 normally bridges a resistance 14 and when the coil operates the contactor to close the switch 7, the switch 11 opens and the resistance 14 is thereby inserted in series with the coil, to reduce the current flowing therein.

The relay $d$, as shown, comprises the core 15 having laterally projecting pole pieces $15^a$ and $15^b$, and a centrally pivoted armature 16. The armature carries, near one end, an insulated contact piece $16^a$ adapted to engage the stationary contacts 17 of the switch 9, and an adjustable spring 18, connected to the armature, normally holds the armature in the position shown, with the switch open.

A coil 19 for energizing the relay core to cause closure of the switch is connected to the generator terminals. As shown, the circuit of the coil extends from the generator terminal 3 through conductors 4 and 20 to the coil, thence by conductor 21 through resistance 22 to the terminal 2. When the contactor $c$ is closed a resistance 23 is connected in parallel with the coil 19. The circuit for including this resistance extends from conductor 4 to switch 24 of the contactor, thence through conductor 25 to resistance 23, thence through resistance 22 and conductor 21 to generator terminal 2.

The relay core also carries a coil 26 which is included in the charging circuit between the contactor switch 7 and the positive pole of the battery b. This coil is wound so as to act cumulatively with the coil 19 in energizing the magnet core while current is flowing from the generator to the battery, and to act in opposition to the coil 19 when the battery current starts to flow in the opposite direction, that is, from the battery to the generator.

When the generator is at rest, the relay switch and the contactor switches 7 and 24 remain open as shown in the diagram. When the generator is in operation current flows through the relay coil 19 which is connected permanently across the terminals of the generator, through a resistance. While the potential of the generator is too low for charging the battery, the current flowing in the coil 19 will be insufficient to cause closure of the relay switch 9, but when, by reason of increased speed of the generator armature, the generator voltage increases to a predetermined value, higher than the normal battery voltage, the current flowing in the coil 19 will energize the magnet core sufficiently to cause its armature to rock and close the switch. When the relay switch closes, it completes the circuit through the contactor coil 8 which attracts its core and causes the switches 7 and 24 to close and the switch 11 to open practically simultaneously. The closure of the switch 7 completes the charging circuit from the generator to the battery through the coil 26, and the current flowing through this coil acts cumulatively with the current in the coil 19 to hold the armature of the relay in closed position. The closure of the contact switch 24 connects the resistance 23 in parallel with the coil 19, and this reduces the current flowing in the latter coil. While a relatively strong current flow is required in the coil 19 to cause the magnet to attract the armature and close the relay switch, less current is required in the coil to hold the switch in closed position, and it is then desirable to reduce the current flowing through the coil, to weaken the magnet so that when the potential of the generator drops below that necessary for charging the battery, the magnet will release its armature and the relay switch will open the circuit of the contactor coil, and the contactor will open the charging circuit. As the current in the coil 26 acts cumulatively with that in the coil 19 to energize the relay magnet while the contact is closed and the generator is charging the battery and as this condition takes place at the same time that the current in the coil 19 is reduced by introduction of the parallel resistance 23, the current flow in the coil 19 may be reduced below that which would be required in this coil to keep the relay switch closed if the coil 26 were not present. If, by reason of slowing down of the speed of the generator armature, the voltage of the generator drops to that of the battery, so that no current flows through the coil 26, the current flowing in the coil 19 will be insufficient to cause the magnet to hold the armature and the latter will open the relay switch. If the armature is not released under the condition of no current flow in the coil 26, it will be released when the generator voltage drops slightly below the battery voltage because then the flow of current will be from the battery to the generator and the current flow in the coil 26 will be reversed, causing the latter coil to oppose the coil 19, so that the magnetizing force of the latter coil will be partly or wholly neutralized and the spring will quickly rock the armature to the open position, thus causing the contactor magnet to be de-energized and the contactor will then open the charging circuit. When the contactor opens the charging circuit it also opens the circuit through the resistance 23 so that the magnet coil 19 will receive full current from the generator and will become effective to close the relay switch when the voltage of the generator again rises to the predetermined point where the charging circuit should be closed.

The tension of the spring 18 may be varied by means of the adjusting nuts 18a so that a stronger or weaker magnetic pull on the armature will be required to close the relay switch, as may be desired. The spring tension will, in practice, always be adjusted so that the switch can not close until the generator voltage is higher than the battery voltage.

Instead of connecting the resistance 23 in parallel with the coil 19, this resistance may be connected in series with the coil and normally bridged by a switch on the contactor, which switch will be opened when the contactor operates, to thereby reduce the current flowing in the coil. This is illustrated in the diagram Fig. 2, wherein a resistance 23a in the conductor 20a which leads to the coil 19 is bridged by a metal disc 27, which latter is lifted when the contactor operates. With this exception Fig. 2 is the same as Fig. 1 and the mode of operation is the same. While I prefer to utilize the contactor as a means for controlling the resistance which weakens the circuit in the energizing coil of the relay, this resistance can be controlled, to accomplish the same result, by the relay armature.

What I claim is:

In a battery charging system, the combination with a generator operable at varying speeds, a battery, a normally open charging circuit, a contactor for closing said circuit, a normally open circuit for the magnet of the contactor connected to the terminals of the generator, a relay comprising a magnet having an energizing coil connected to the generator terminals and an armature movable by the magnet to close the last mentioned circuit when the current in said coil attains a predetermined value, to thereby cause the contactor to close the charging circuit, said relay magnet having also a coil in the charging circuit adapted to act cumulatively with the energizing coil while current is flowing from the generator to the battery and means controlled by the contactor for reducing the current in the energizing coil when the contactor closes the charging circuit.

JOSEPH F. FRESE.